US008428833B2

(12) United States Patent
Toda

(10) Patent No.: US 8,428,833 B2
(45) Date of Patent: Apr. 23, 2013

(54) METHOD AND DEVICE FOR CONTROLLING POWER OUTPUT OF ENGINE FOR WORKING MACHINE

(75) Inventor: Eiji Toda, Tochigi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/151,575

(22) Filed: Jun. 2, 2011

(65) Prior Publication Data

US 2011/0231070 A1    Sep. 22, 2011

Related U.S. Application Data

(60) Continuation of application No. 12/849,934, filed on Aug. 4, 2010, now Pat. No. 7,979,183, which is a division of application No. 10/570,170, filed as application No. PCT/JP2004/012641 on Sep. 1, 2004, now Pat. No. 8,010,260.

(30) Foreign Application Priority Data

Sep. 2, 2003   (JP) .................................. 2003-309533

(51) Int. Cl.
*G06F 7/70* (2006.01)
(52) U.S. Cl.
USPC ................... 701/50; 701/51; 701/52; 701/56; 701/62; 701/84; 701/90
(58) Field of Classification Search .................... 701/50, 701/51, 52, 56, 62, 84, 90; 180/175, 176, 180/177, 307, 305, 69.25, 441
See application file for complete search history.

(56) References Cited

U.S. PATENT DOCUMENTS 4,675,827 A * 6/1987 Narita et al. ..................... 701/50
4,836,165 A * 6/1989 Kubota et al. .................. 123/357
(Continued)

FOREIGN PATENT DOCUMENTS

DE    4 446 296 A1    6/1995
EP    0 073 288 A1    3/1983
(Continued)

OTHER PUBLICATIONS

European Search Report dated Dec. 8, 2008, issued in corresponding European Patent Application No. 04772597.3.

(Continued)

*Primary Examiner* — Khoi Tran
*Assistant Examiner* — Jorge Peche
(74) *Attorney, Agent, or Firm* — Westerman, Hattori, Daniels & Adrian, LLP

(57) ABSTRACT

An engine control device detects the state of work of a working vehicle such as a construction machine or the like, and controls the power output capacity of an engine automatically. A determination is made as to whether excavation or uphill traveling is being performed, based upon the detection signals from a hydraulic oil pressure detector for a hydraulic cylinder of an arm, detectors for arm and bucket operation commands, a shift operation detector for a transmission, a pitch angle detector for the vehicle body, a traveling acceleration detector, and an accelerator opening degree detector. When the result of this determination is that excavation or uphill traveling is being performed, the engine is controlled to operate at a high power capacity, while at other times it is controlled to operate at a low power output capacity.

1 Claim, 12 Drawing Sheets

U.S. PATENT DOCUMENTS

| | | | |
|---|---|---|---|
| 5,052,179 A * | 10/1991 | Fujii | 60/421 |
| 5,082,071 A * | 1/1992 | Kyrtsos et al. | 177/25.14 |
| 5,113,957 A * | 5/1992 | Tamai et al. | 172/10 |
| 5,224,033 A * | 6/1993 | Nakamura et al. | 700/65 |
| 5,249,421 A * | 10/1993 | Lunzman | 60/422 |
| 5,251,440 A * | 10/1993 | Bong-dong et al. | 60/329 |
| 5,267,441 A | 12/1993 | Devier et al. | |
| 5,295,353 A | 3/1994 | Ikari | |
| 5,312,163 A | 5/1994 | Hanamoto et al. | |
| 5,468,126 A | 11/1995 | Lukich | |
| 5,526,885 A * | 6/1996 | Kuvshinov et al. | 173/17 |
| 5,630,317 A | 5/1997 | Takamura et al. | |
| 5,758,499 A * | 6/1998 | Sugiyama et al. | 60/450 |
| 6,073,442 A * | 6/2000 | Creger et al. | 60/446 |
| 6,122,848 A | 9/2000 | Fukuda et al. | |
| 6,321,535 B2 | 11/2001 | Ikari et al. | |
| 6,349,252 B1 * | 2/2002 | Imanishi et al. | 701/50 |
| 6,389,808 B1 * | 5/2002 | Sakai | 60/422 |
| 6,401,856 B1 * | 6/2002 | Kohlmorgen | 180/307 |
| 6,582,340 B1 | 6/2003 | Arie et al. | |
| 7,474,962 B2 | 1/2009 | Waid et al. | |
| 2001/0008068 A1 | 7/2001 | Ikari et al. | |
| 2001/0056319 A1 * | 12/2001 | Rocke | 701/50 |
| 2002/0024431 A1 * | 2/2002 | Rieger et al. | 340/438 |
| 2003/0040862 A1 | 2/2003 | Eckert et al. | |
| 2003/0156949 A1 | 8/2003 | Shimomura et al. | |
| 2008/0307414 A1 * | 12/2008 | Alpern et al. | 718/1 |

FOREIGN PATENT DOCUMENTS

| | | | |
|---|---|---|---|
| EP | 0 265 526 A1 | | 5/1988 |
| EP | 1 319 763 A1 | | 6/2003 |
| JP | 61-14447 A | | 1/1986 |
| JP | 61-110625 A | | 5/1986 |
| JP | 63-004131 A | | 1/1988 |
| JP | 3-50034 A | | 3/1991 |
| JP | 3-92561 A | | 4/1991 |
| JP | 3-51400 Y2 | | 11/1991 |
| JP | 3-275818 A | | 12/1991 |
| JP | 2662107 B2 | | 11/1992 |
| JP | 6-74757 B2 | | 9/1994 |
| JP | 7-11986 A | | 1/1995 |
| JP | 7-103593 B2 | | 11/1995 |
| JP | 8-218442 A | | 8/1996 |
| JP | 08218442 A | * | 8/1996 |
| JP | 10-89111 A | | 4/1998 |
| JP | 10-252520 A | | 9/1998 |
| JP | 11-166248 A | | 6/1999 |
| JP | 11-193731 A | | 7/1999 |
| JP | 11-293710 A | | 10/1999 |
| JP | 11293710 A | * | 10/1999 |
| JP | 2001-32330 A | | 2/2001 |
| JP | 2001-115495 A | | 4/2001 |
| JP | 2003-184134 A | | 7/2003 |

OTHER PUBLICATIONS

Japanese Office Action dated May 11, 2010, issued in corresponding Japanese Patent Application No. 2005-513650.
Japanese Office Action dated Aug. 26, 2008, issued in corresponding Japanese Patent Application No. 2005-513650.
International Search Report of PCT/JP2004/012641, mailing date of Nov. 9, 2004.
Japanese Office Action dated Sep. 17, 2009, issued in corresponding Japanese Patent Application No. 2005-513650.
Partial Human Translation of Masafumi et al. (JP 11-293710).
Japanese Office Action dated Sep. 13, 2011, issued in corresponding Japanese Patent Application No. 2010-153117.

* cited by examiner

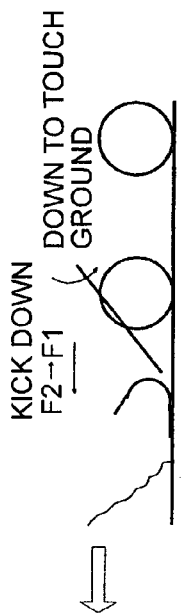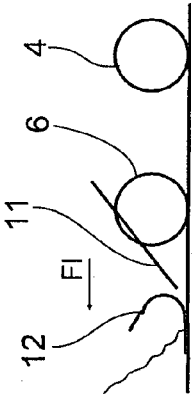

METHOD AND DEVICE FOR CONTROLLING POWER OUTPUT OF ENGINE FOR WORKING MACHINE

CROSS-REFERENCE TO RELATED APPLICATIONS

This application is a continuation application of U.S. Ser. No. 12/849,934, filed Aug. 4, 2010, which is a divisional of Ser. No. 10/570,170, filed Mar. 1, 2006, which is a National Phase filing of PCT/JP2004/12641, filed Sep. 1, 2004, and is based upon and claims the benefit of priority from Japanese Patent Application No. 2003-309533, filed Sep. 2, 2003, the entire contents of all of which are incorporated by reference.

TECHNICAL FIELD

The present invention relates to a method and a device for controlling the power output of an engine for a working vehicle.

BACKGROUND ART

For a working vehicle such as a construction machine or the like, techniques have been known from the past of changing over the power output performance of an engine according to the work load (for example, see Patent References #1 and #2). According to these techniques, the working vehicle is provided with a heavy work mode in which it is possible to obtain power output up to a high level, and with a light work mode in which it is only possible to obtain power output up to a low level.

The driver selects between these modes by hand by operating a changeover switch. In other words, if he determines that the work which will be performed henceforward is heavy work, then he selects the heavy work mode, while if he determines that it is light work, then he selects the light work mode.

At this time, a controller which controls the engine controls the power output capacity of the engine according to a command from the changeover switch. In other words, for the light work mode, it limits the power output range of the engine to be less than or equal to a predetermined value which is lower than its rated power output, for example by limiting the fuel supply amount. By contrast, for the heavy work mode, it does not impose the above described limitation, so that it is possible for the power output of the engine to reach the rated power output or the maximum power output.

Since, by doing this, a narrow low power output range is used during light work, accordingly the consumption of energy becomes small so that the fuel consumption is reduced. And since, during heavy work, no limitation is imposed upon the power output of the engine, it is possible to obtain sufficient power output for performing the work smoothly.

Patent Reference #1: Japanese Patent Laid-Open Publication Heisei 08-218442.
Patent Reference #2: Japanese Patent Laid-Open Publication Heisei 11-293710.

With a certain type of working vehicle, it often happens that the vehicle does not continuously perform only heavy work or only light work, but rather performs heavy work and light work alternately during a series of work processes. For example, with a wheel loader, during typical excavation and loading work, the vehicle successively performs processes such as approaching the subject material for work (which is light work), excavating the subject material for work and loading it into the bucket (which is heavy work), and dumping of the subject material for work upon a transportation vehicle such as a dump truck or the like (which is light work).

With this type of working vehicle or working process, in order to enjoy the benefits of the prior art technique to the maximum level, the driver must operate the changeover switch while changing over between heavy work and light work. However, it is very burdensome to perform such switch operation frequently during the working process. As a result, it often happens that work is performed with the changeover switch always left fixed in the heavy work mode, so that it is not possible to anticipate any reduction in the fuel consumption. On the other hand, if emphasis is placed upon the fuel consumption, and work is performed with the changeover switch left fixed in the light work mode, then it is not possible to obtain sufficient power output during heavy work such as excavation, and there is a fear that the working efficiency will be deteriorated.

DISCLOSURE OF THE INVENTION

The objective of the present invention is, for a working vehicle such as a construction machine or the like, to control the power output capacity of the engine automatically according to the working state.

According to the present invention, one or a plurality of variable values relating to a state or states of one or a plurality of work loads which consume power output from the engine is detected, and the power output capacity of the engine is controlled based upon the detected variable value. As a result, it is possible to control the power output capacity of the engine automatically according to the state of working.

A work apparatus such as, for example, an arm and/or a bucket may be included in the above work loads. As the variable value relating to the state of the work apparatus, for example, it is possible to employ the hydraulic oil pressure of a hydraulic cylinder for operating the above work apparatus, the type of operation which is performed with respect to the above work apparatus, or the position or attitude of the above work apparatus.

Or a travel apparatus consisting of, for example, wheels and a transmission may be included in the above work loads. As a variable values relating to the state of the travel apparatus, for example, it is possible to employ the type of gearshift operation which is performed with respect to a transmission, a speed stage which is selected at the transmission, the pitch angle in the longitudinal direction (i.e. in the traveling direction) of the vehicle body, or the vehicle traveling speed, or the traveling acceleration which corresponds to the opening degree of the accelerator pedal.

As one example of control, it is possible to determine whether or not excavation is being performed, based upon the result of detecting the value of a specific variable relating to the state of the work apparatus or of the travel apparatus. According to the result of this determination, it is possible to perform control of the power output capacity so that the upper limit output torque curve in the case that it is determined that excavation is not being performed is lower than the upper limit output torque curve in the case that it is determined that excavation is being performed.

As another example of control, it is possible to determine whether or not uphill traveling is being performed, based upon the result of detecting the value of a specific variable relating to the state of the travel apparatus. According to the result of this determination, it is possible to perform control of the power output capacity so that the upper limit output torque curve in the case that it is determined that uphill traveling is not being performed is lower than the upper limit output torque curve in the case that it is determined that uphill traveling is being performed.

As yet another example of control, based upon the result of detecting the values of specific variables relating to the states of the work apparatus and of the travel apparatus, it is possible to perform a determination as to whether or not excavation is being performed, and, in parallel, to perform a determination as to whether or not uphill traveling is being performed. And, if it is determined that neither excavation nor uphill traveling is being performed, it is possible to perform control of the power output capacity so that the upper limit output torque curve is lower than the upper limit output torque curve in the case that it is determined that at least one of excavation and uphill traveling is being performed.

And, as still another example of control, based upon the result of detecting the values of specific variables relating to the states of the work apparatus and of the travel apparatus, it is possible to perform a determination as to which one of various different types of work processes is being performed. And it is possible to control the power output capacity of the engine so that the upper limit output torque curve is different according to which work process is determined.

And, as even yet another example of control, based upon the result of detecting the value of a specific variable relating to the state of the work apparatus or of the travel apparatus, it is possible to perform a determination as to the magnitude of power output which the work load, i.e. the work apparatus or the travel apparatus, will demand. And it is possible to control said power output capacity either stepwise or continuously, according to the result of this determination.

In a preferred embodiment, a determination is made as to whether or not the excavation process is being performed, based upon the detected value of the pressure of a hydraulic cylinder which drives the work apparatus. Since the hydraulic cylinder pressure of the work apparatus changes in sensitive response to the starting and the stopping of the excavation process, the reliability of this determination about the excavation process is high. And, when the excavation process is being performed, the engine is controlled to operate in a high output mode which can manifest the full high power output capacity which the engine really has. On the other hand, during any process other than the excavation process, the engine is controlled to operate in a low output mode in which the power output capacity is limited to be lower than in the high output mode. In this low output mode, the engine is limited so that its upper limit output torque curve becomes one which is defined by multiplying the upper limit output torque curve for the high output mode by a predetermined coefficient which is less than 1.

And, in a preferred embodiment, further, a determination is made as to whether or not the vehicle is currently traveling uphill, based upon the detection result for the pitch angle of the vehicle body while it is traveling, or for the traveling acceleration which depends upon the accelerator pedal opening degree. And the engine is controlled to operate in the above described high output mode, not only during the excavation process, but also while uphill traveling is being performed.

BRIEF DESCRIPTION OF THE DRAWINGS

FIGS. 2A-2H are explanatory figures showing examples of excavation and loading working processes by the wheel loader.

BEST MODE FOR CARRYING OUT THE INVENTION

In the following, several embodiments of the control device and the control method for an engine of a working vehicle according to the present invention will be described in detail with reference to the drawings.

In the following disclosure, a wheel loader is taken as an example of a working vehicle, and embodiments of the present invention for controlling the power output of an engine of a wheel loader are explained. However, this wheel loader is shown as an example for explanation of the present invention; the present invention could also be applied to engine power output control of various other types of working vehicle.

Figure 1:
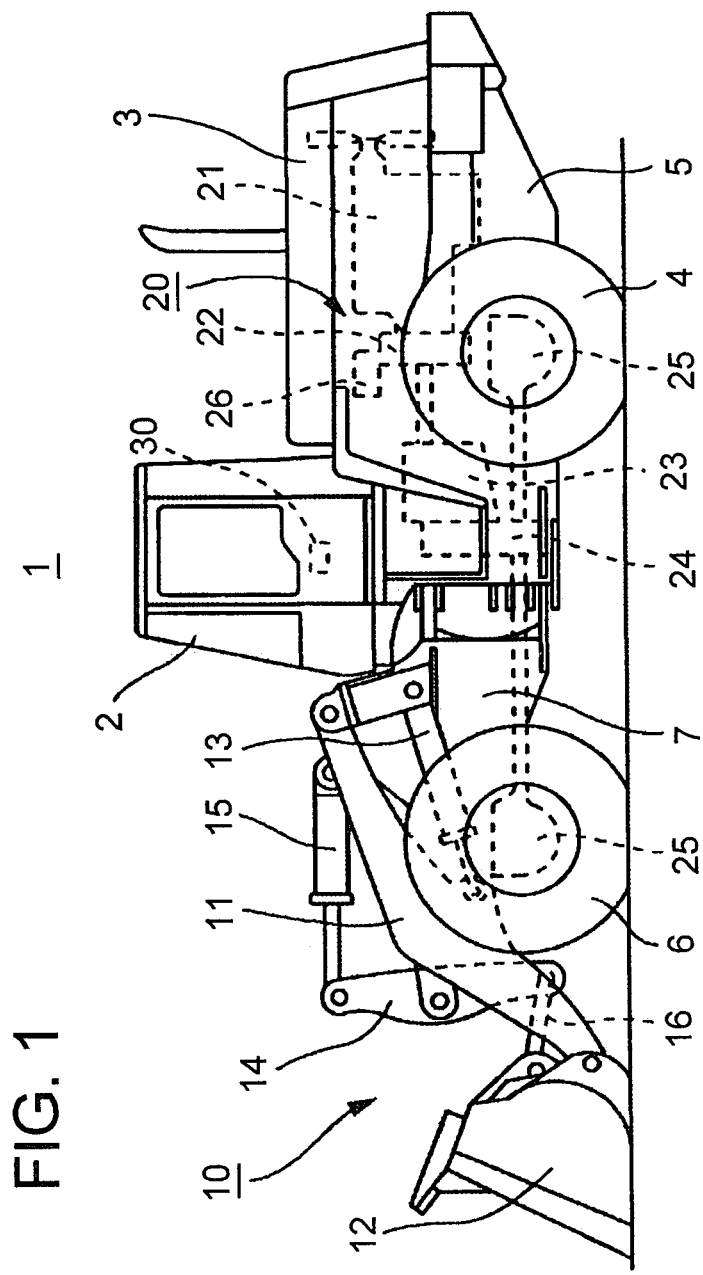
FIG. 1 is a side view of a wheel loader.

FIG. 1 is a side view of a wheel loader 1, which is an example of a working vehicle.

As shown in FIG. 1, this wheel loader 1 comprises a rdivers cab 2, a vehicle rear body portion 5 comprising an engine room 3 and rear wheels 4, 4, and a front frame portion 7 comprising front wheels 6, 6. A work apparatus 10 is fitted to the front frame portion 7.

A base end portion of a lift arm 11 of this work apparatus 10 is freely pivotally attached to the front frame portion 7. The front frame portion 7 and the lift arm 11 are coupled together by a pair of lift cylinders 13, 13, and the lift arm 11 is pivoted by these lift cylinders 13, 13 extending and retracting. A bucket 12 is freely pivotally attached to the end portion of the lift arm 11.

A tilt arm 14 is freely rotatably supported upon the lift arm 11, almost at its central portion. One end portion of this tilt arm 14 and the front frame portion 7 are coupled together by a tilt cylinder 15, and the other end portion of the tilt arm 14 and the bucket 12 are coupled together by a tilt rod 16. When the tilt cylinder 15 extends and retracts, the bucket 12 pivots.

At the vehicle rear body portion 5, there are mounted a travel apparatus 20 for propelling this wheel loader 1, and an engine 21 which supplies its output power to the travel apparatus 20. The travel apparatus 20 comprises a torque converter 22, a transmission 23 which is capable of changing over between forward and reverse traveling and is also capable of changing between a plurality of speed change stages, a differential 24, speed reduction devices 25, 25 which drive the rear wheels 4 and the front wheels 6, and the like. The power output of the engine 21 is transmitted to the differential 24 via the torque converter 22 and the transmission 23 in order, and from there is distributed to the rear wheels 4 and the front wheels 6.

At the vehicle rear body portion 5, there is also mounted a variable capacity hydraulic pump 26 which supplies pressurized hydraulic fluid to the above described lift cylinders 13 and tilt cylinder 15. This variable capacity type hydraulic pump 26 is driven using a portion of the power outputted from the above described engine 21.

Within the rdivers cab 2 there is provided a maneuvering device 30 which includes a transmission shift lever, an accelerator pedal, and a brake pedal, and which also includes levers or the like which operate the lift cylinders 13 and the tilt cylinder 15, all of which are operated by the driver. By the driver operating this maneuvering device 30, it is possible for him to perform changing over of the wheel loader 1 between forward and reverse traveling, adjustment of its traveling speed (acceleration and deceleration), and operation of the work apparatus 10 (i.e. of the lift cylinders 13 and of the tilt cylinder 15).

Furthermore, in the vehicle rear body portion 5, there is also mounted an engine control device (omitted from FIG. 1) for controlling the driving of the lift cylinders 13 and of the tilt cylinder 15 in response to operation signals from the maneuvering device 30, and for controlling the power output capacity of the engine 21 according to the theory of the present invention. This engine control device will be described in detail hereinafter.

With this type of wheel loader 1, load components which consume the power output of the engine 21 include work loads and parasitic loads. By "work loads" is meant components which demand power output from the engine 21 in order to perform tasks which apply work directly upon the external environment of the vehicle (such as excavation or raising of the ground or of a cliff, shifting of the vehicle itself, and so on). For example, the above described work machine 10, variable capacity type hydraulic pump 26, and travel apparatus 20 are included as work loads. By contrast, by "parasitic loads" is meant components which demand power output from the engine 21 in order to operate internally to the vehicle without performing work. For example, an engine cooling system, an air conditioning system, a battery charging system and the like are provided and are included as parasitic loads, but none of these are shown in FIG. 1.

The above described engine control device is endowed with the functions of detecting the states of the work loads (for example, of the work machine 10, of the variable capacity type hydraulic pump 26, and of the travel apparatus 20) (hereinafter this will be termed the "working state"), and of controlling the power output capacity of the engine 21 by inferring the level of power output which these work loads demand. When performing work which consists of a sequence of a plurality of processes, the level of power output which the work loads demand often is different according to the process. For example it may happen that, among the sequence of processes, a comparatively high power output may be demanded by a specific process, but a comparatively low power output is sufficient for the other processes. In the following, the power output control by the engine control device will be explained in concrete terms by taking the example of excavation and loading work, which is a typical type of work for which the wheel loader 1 may be used.

FIGS. 2A to 2H show an example of a sequence of work processes for the wheel loader 1 to perform excavation and loading work.

The wheel loader 1 repeatedly performs a plurality of processes like the following in order, in order to excavate subject material for work and to load this subject material for work into a transportation machine such as a dump truck or the like.

A forward traveling process (FIG. 2A): the driver drives the vehicle to travel forward towards the subject material for work while, by operating the lift cylinders 13 and the tilt cylinder 15, setting the work apparatus 10 into an excavation attitude in which, with the lift arm 11 in a low position, the bucket 12 is oriented horizontally.

An excavation process: (FIGS. 2B and 2C): the driver drives the vehicle further forward and digs the blade edge of the bucket 12 into the subject material for work (FIG. 2B: the digging in sub-process), and then he operates the tilt cylinder 15 and tilts the bucket 12 back, so that the subject material for work is scooped up into the bucket 12 (FIG. 2C: the scooping up sub-process). According to the type of the subject material for work, this scooping up sub-process sometimes can be completed by simply tilting the bucket 12 backwards in one movement; or in some cases the operations of tilting the bucket 12 back, putting it into neutral, and again tilting it back are repeatedly performed.

A reverse traveling and boom raising process (FIG. 2D): After having scooped up the subject material for work into the bucket 12, while driving the vehicle to travel backwards, the driver extends the lift cylinders 13 so as to raise the lift arm 11.

A forward traveling and boom raising process (FIG. 2E): While driving the vehicle to travel forward and bringing it near to a dump truck, the driver further extends the lift cylinders 13 and raises the lift arm 11, until the height of the bucket 12 reaches a loading height.

A soil dumping process (FIG. 2F): The driver dumps the bucket 12 at a predetermined position, thus loading the subject material for work upon the load bed of the dump truck. This process often is performed while continuing to travel forward from the previous forward traveling and boom raising process.

A reverse movement and boom lowering process (FIG. 2G): The driver lowers the lift arm 11 while driving the vehicle to travel backwards, thus returning the bucket 12 to the excavation attitude.

The above are typical processes which make up one cycle of the excavation loading work.

Furthermore, in FIG. 2H, there is shown a simple traveling process in which the vehicle simply travels along. In this process, the driver drives the vehicle to travel forward while keeping the lift arm 11 in a low position. It sometimes also is the case that a load is loaded into the bucket 12 and the load is transported, and it is also sometimes the case that the vehicle is driven without carrying any load.

The power output of the engine 21 which is required during these six types of process is different for each process. In particular, during the excavation process (FIGS. 2B and 2C), a greater power output is required than during the other processes. Thus, it is desirable to perform a determination as to which process is currently being performed, and to perform control of the power output capacity of the engine 21 so as to be able to output the power which is required by this current process. In this case, t is possible to divide the above described six types of processes generally into two types of process, the excavation process and the other processes, and to control the power output capacity of the engine 21 in two steps. Or, the above described six types of processes may be divided into three or more types, and the power output capacity of the engine 21 may be controlled in three or more steps. Or, preferably, it may be arranged to determine the level of power output which the work load demands by determining which process is being performed, and, according thereto, to vary the power output capacity of the engine 21 stepwise or continuously Here by the power output capacity of the engine 21 is meant, the maximum level of power which the engine 21 has the capability or the capacity to output. Control of the power output capacity of the engine 21 may typically be performed by, for example, a method of controlling the upper limit value of the amount of fuel injection to the engine 21. For example, if the upper limit value of the fuel injection amount is set to be greater, then the power output capacity becomes higher; while, if the upper limit value of the fuel injection amount is set to be lower, then the power output capacity becomes lower. It is possible to display the power output capacity using a torque curve, which shows the upper limit output torque which can be outputted according to the rotational speed of the engine 21. The higher is the upper limit output torque curve, the higher does the power output capacity become.

Figure 3:
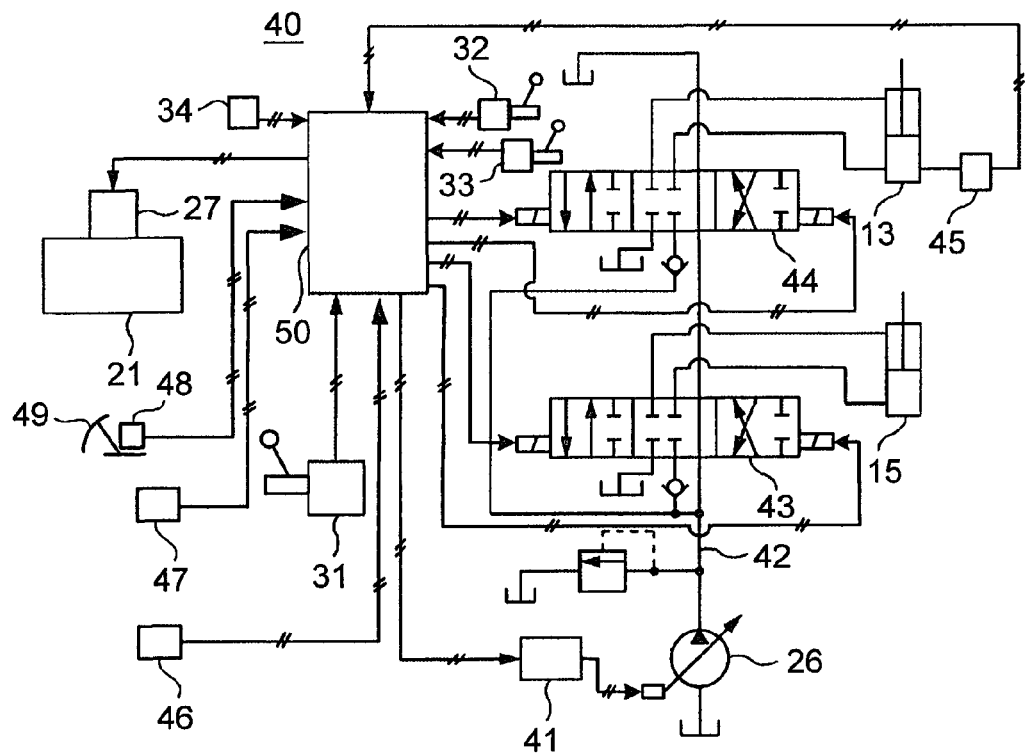
FIG. 3 is a system diagram of an engine control device.

FIG. 3 is a system diagram showing an example of an engine control device 40 which performs control of the power output capacity of the engine 21.

In FIG. 3, a controller 50 can be implemented by a computer which comprises a storage device which is used, for example, as a program memory and a work memory, and a CPU which executes a program. This controller 50 is connected to a governor 27 which controls the power output of the engine 21 by adjusting the amount of fuel injection which is supplied to the engine 21 by a fuel injection pump not shown in the figures. It becomes possible to vary the power output of the engine 21 by outputting commands from the controller 50 to the governor 27, and varying this fuel injection amount. The engine 21 drives the variable capacity type hydraulic pump 26, which is one of its work loads.

A capacity control device 41 is connected to the variable capacity type hydraulic pump 26. Orders are outputted from the controller 50 to the capacity control device 41, and thereby it becomes possible to vary the capacity of the variable capacity type hydraulic pump 26. Upon a discharge circuit 42 of the variable capacity type hydraulic pump 26, there are provided a tilt operation valve 43 which is connected to the tilt cylinder 15, which is one of the work loads, and a lift operation valve 44 which is connected to the lift cylinders 13, which similarly constitute one of the work loads.

A bottom pressure detector 45 is provided at the bottom end of one of the lift cylinders 13. (Here by the "bottom end" is meant the end of the cylinder at which increase of hydraulic oil pressure causes it to extend. The opposite end to the "bottom end" is termed the "head end" or the "rod end".) This bottom pressure detector 45 is, for example, a pressure switch. The detection signal for the bottom pressure which is outputted from the bottom pressure detector 45 is inputted to the controller 50.

Furthermore, the controller 50 is connected to a shift position detector 31 which detects the position of a transmission shift lever which is included in the maneuvering device 30, and it inputs this detection signal for the shift position from the shift position detector 31, thereby detecting shift operation of the transmission 23 of the travel apparatus 20 (or the speed stage which has been selected by software operation), which is one of the work loads. When the transmission 23 is a transmission 23 which has, for example, four forward traveling speed stages (F1 to F4) and two reverse traveling speed stages (R1 and R2), then, based upon this shift position detection signal, the controller 50 detects which speed stage among the speed stages F1 to F4, R1, and R2 has been selected.

The controller 50 is further connected to an arm operation command detector 32 which detects the position of a lift cylinder operating lever (a lift arm operating lever) included in the maneuvering device 30 (in other words, which detects an arm operation command from the driver), and inputs an operation command detection signal from this arm operation command detector 32. The controller 50 controls the lift operation valve 44 based upon this operation command detection signal, so as to operate the lift arm 11. Furthermore, the controller 50 detects the type of operation (for example, raise, neutral, lower, or float) which is currently being performed for the lift arm 11, based upon the detection signal from the arm operation command detector 32, or upon the operation signal to the lift operation valve 44.

Furthermore, the controller 50 is connected to a bucket operation command detector 33 which detects the position (in other words, a bucket operation command from the driver) of a tilt cylinder operating lever (i.e. a bucket operating lever) which is included in the maneuvering device 30, and inputs an operation command detection signal from this bucket operation command detector 33. And, based upon this bucket operation command detection signal, the controller 50 operates the bucket 12 by controlling the tilt operation valve 43. Moreover, the controller 50 detects the type of operation which is currently being performed for the bucket 12 (for example, tilt back, neutral, or dump), based upon the operation command detection signal from the bucket operation command detector 33 or upon the operation signal to the tilt operation valve 43.

The controller 50 further is connected to a speed meter 34 which detects the traveling speed of the vehicle, and inputs a traveling speed detection signal from this speed meter 34.

The controller 50 controls the power output capacity of the engine 21, according to the theory of the present invention, based upon one or more variable values among various variable values which indicate various work load states which have been detected, such as the shift operation of the transmission 23 (the speed stage which has been selected), the bottom pressure of the lift cylinder 13, the operation of the lift arm 11, the operation of the bucket 12, the traveling speed of the vehicle, and the like. The procedure for this control will now be explained in the following.

Figure 4:
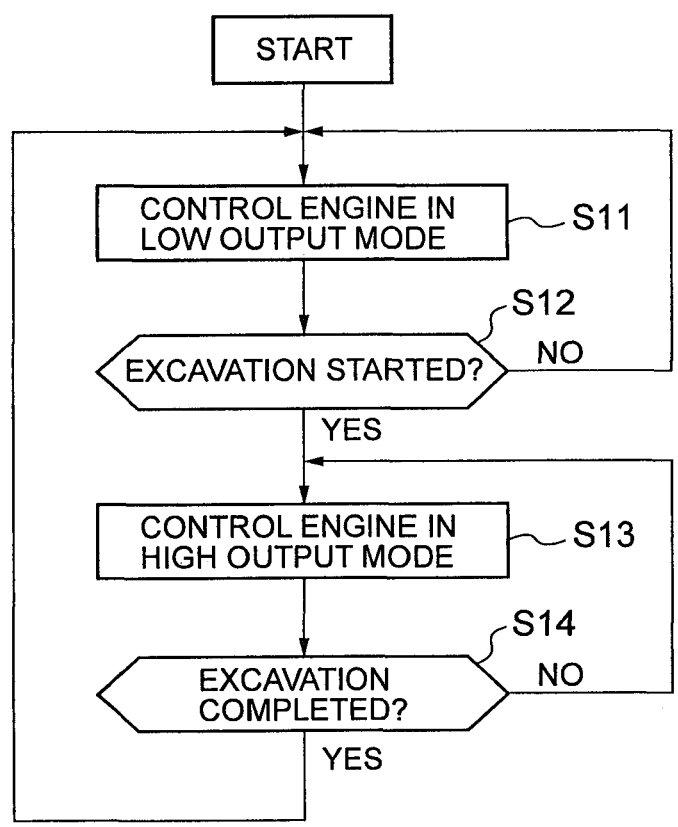
FIG. 4 is a flow chart showing a summary of an engine control procedure.

In FIG. 4, a summary of an example of a control procedure for the output capacity of the engine 21 is shown by a flow chart.

By the control shown in FIG. 4, it is determined, based upon the values of specified variables which indicate the above described working states, whether or not the process which is currently being performed is a predetermined process in which particularly high power output is demanded (for example, the excavation process). Based upon the result of this determination, one or the other of two types of control modes which have been set up in advance, a "low output mode" and a "high output mode", is selected as the mode for controlling the power output capacity of the engine. The concrete meanings of these two types of control modes will be explained hereinafter.

As shown in FIG. 4, in a step S11, the controller 50 first outputs a command to the governor 27 simultaneously with the starting of the engine 21, and drives the engine 21 in the low output mode. In this low output mode, the controller 50 commands the governor 27 by a method such as, for example, limiting the upper limit value of the range of variability of the injection amount (mg/stroke) of a fuel injection pump not shown in the figures to a predetermined low value, or the like, so as to limit the power output capacity of the engine 21 to be lower than in the high output mode.

And, in a step S12, the controller 50 performs an excavation start determination which will be described hereinafter, and determines whether or not the wheel loader 1 is performing the excavation process (from FIG. 2A described previously to FIG. 2B). If the result of the step S12 is that excavation work is not being performed, then the flow of control returns to the step S11.

If the result of the step S12 is that excavation work is being performed, then the flow of control proceeds to a step S13, and the controller 50 outputs a command to the governor 27 to drive the engine 21 in the high output mode. In the high output mode, the controller 50 raises the power output capacity of the engine 21 to be higher than in the low output mode (for example, it enables the engine 21 to manifest the maximum power output which it basically possesses), by canceling the above described limitation with regard to the injection amount of the fuel injection pump, thus raising the upper limit value of the range of variability of the fuel injection amount to be higher than in the low output mode, or the like.

And, in a step S14, the controller 50 performs a excavation completed determination which will be described hereinafter, and determines whether or not the excavation process by the wheel loaded 1 has been completed. If the result of the step S14 is that the excavation process has not been completed, then the flow of control returns to the step S13. Furthermore, if the result of the step S14 is that the excavation process has been completed, then the flow of control returns to the step S11, and the engine 21 is again driven in the low output mode.

In the following, each of the steps of the flow chart shown in FIG. 4 will be explained in detail.

Figure 5:
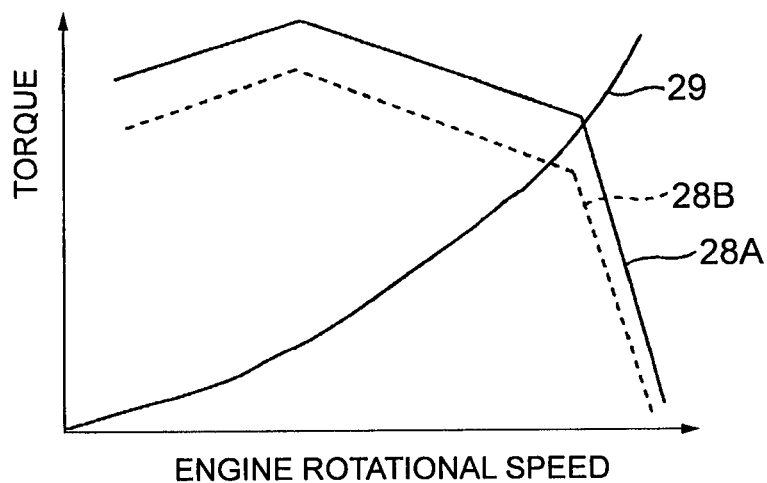
FIG. 5 is a graph showing an example of a curve of upper limit output torque against power output capacity of the engine, in a high output mode and in a low output mode.

First the high output mode and the low output mode of the engine 21, shown in the steps S11 and S14, will be explained. In FIG. 5, there is shown an example of a torque curve showing the power output capacity of the engine 21 in a high output mode and in a low output mode. In FIG. 4, the horizontal axis is the rotational speed of the engine 21, and the vertical axis is the output torque. Furthermore, the curve 29 is a matching curve of the torque converter 22.

In FIG. 5, the solid line 28A indicates the curve of the upper limit output torque of the engine 21 in the high output mode in which it has been arranged to obtain a high power output without imposing any limitation upon the power output capacity of the engine 21, and this, for example, corresponds to the rating or to the maximum power output of the engine 21. Although the output torque of the engine 21 can be varied according to the adjustment of the fuel injection amount by operation of the accelerator pedal by the driver, its range of variability is at or below the upper limit output torque curve 28A.

On the other hand, the broken line 28B indicates the curve of the upper limit output torque of the engine 21 in the low output mode in which it has been arranged to obtain only a lower power output than in the high output mode. This upper limit output torque curve 28B for the low output mode is limited so as to be the upper limit output torque curve 28A in the high output mode, multiplied by a coefficient α (where α<1) (for example, 80%). In the low output mode, the range of variability of the engine output is limited to a low range at or below the upper limit output torque curve 28B. The converse of this is the benefit that it is possible to economize upon fuel. The controller 50 executes the low output mode by a method such as controlling the governor 27 so as to impose a limitation upon the fuel injection amount (for example, making the upper limit value of the fuel injection amount to be lower than during the high output mode), or the like.

Figure 6:
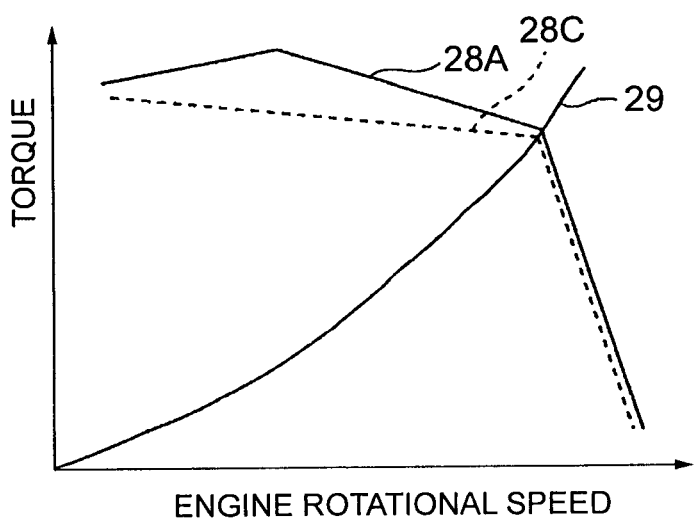
FIG. 6 is another graph showing an example of upper limit output torque against power output capacity of the engine, in a high output mode and in a low output mode.

Furthermore, in FIG. 6 there is shown a torque curve which indicates the power output performance of the engine 21, according to a different example of control. In FIG. 6, the broken line 28C indicates the upper limit output torque curve in the low output mode, and this means that the output torque range of variability is limited to be yet lower than the upper limit output torque curve 28B in the low output mode shown in FIG. 5 and described above. In this manner, there are various variations with regard to what type of torque curve should be used in practice when limiting the power output performance of the engine. It would be acceptable to employ only one of the upper limit output torque curves 28B and 28C for the low output mode shown in FIG. 5 and FIG. 6, or it would also be acceptable to use one or the other of these upper limit output torque curves 28B and 28C according to the current conditions.

Figure 7:
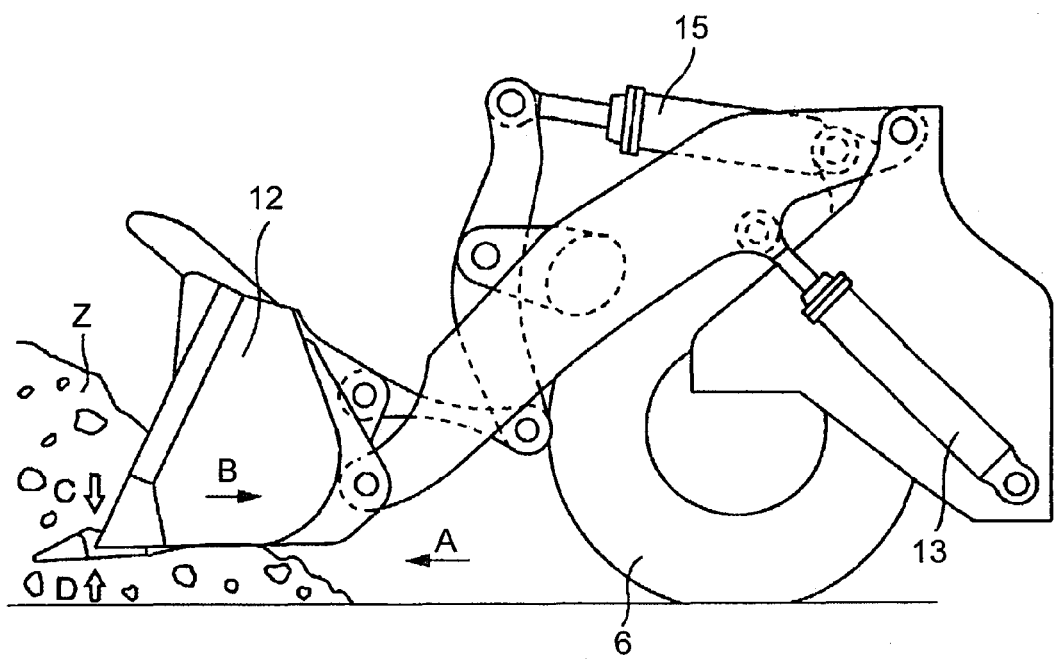
FIG. 7 is a side view showing the state of the work apparatus of the wheel loader during the excavation process.

FIG. 7 is a side view showing a state in which the wheel loader 1 is excavating a subject material for work with the bucket 12.

As shown in FIG. 7, during the excavation process, the vehicle is driven forward in the direction of the arrow sign A and the blade edge of the bucket 12 is dug into the subject material for work Z, and the bucket 12 is tilted backwards. During this operation, forces act upon the bucket 12 in the directions of the arrow sign B and of the arrow sign C. As a result, high pressures are created at the bottom ends of the lift cylinders 13 and the tilt cylinder 15 (their ends at which increase of hydraulic oil pressure causes them to extend). Furthermore, depending upon the work attitude, a force may act upon the bucket 12 in the direction of the arrow sign D, and in this case a high hydraulic oil pressure is created at the head end (the rod end) of the tilt cylinder 15.

The magnitudes of these pressures clearly vary during the excavation process and during the other processes. Accordingly, it is possible to determine whether or not the excavation process is being performed from at least one of the magnitudes of these pressures. For example, it is possible to determine whether or not the excavation process is being performed, by comparing the pressure at the bottom ends of the lift cylinders 13 (hereinafter termed the bottom pressure of the lift cylinders 13) with a reference value which is determined in advance. Or, it is also possible to determine whether or not the excavation process is being performed, by comparing the pressure at the bottom end of the tilt cylinder 15 (hereinafter termed the bottom pressure of the tilt cylinder 15) with a reference value which is determined in advance.

Figure 8:
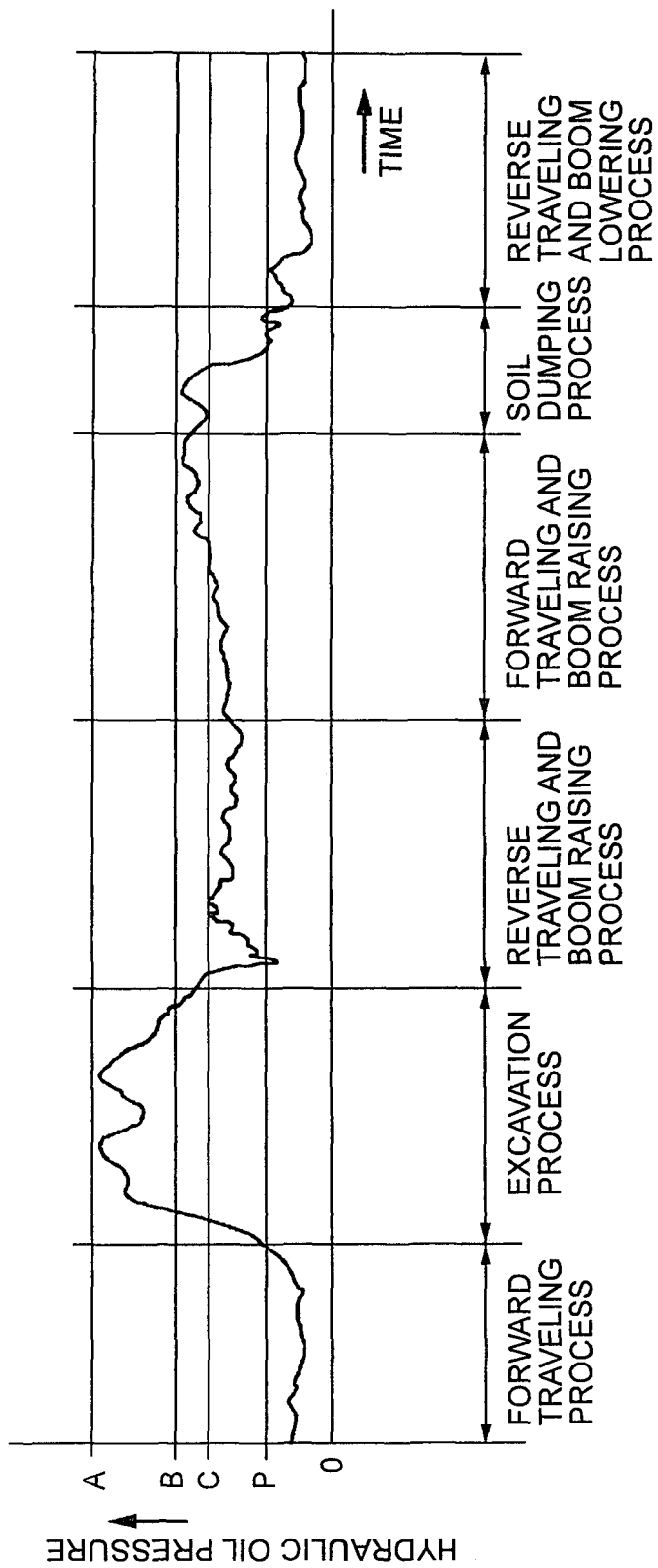
FIG. 8 is a graph showing the change of the bottom pressure of a lift cylinder.

FIG. 8 is a graph showing an example of change of the bottom pressure of the lift cylinders 13 in each of the processes during the excavation and loading work of the wheel loader 1 shown in FIG. 2A through FIG. 2G. In FIG. 8, the bottom pressure of the lift cylinders 13 is shown along the vertical axis, while time is shown along the horizontal axis.

As shown in FIG. 8, the bottom pressure of the lift cylinders 13 is quite low during the forward movement process (FIG. 2A); when the excavation process (FIGS. 2B and 2C) starts, it precipitously rises considerably; it continues to be quite high over the entire period of the excavation process (FIGS. 2B and 2C); and, when the excavation process terminates, it abruptly drops considerably. Now, if a pressure P is set as a reference value as shown in FIG. 8, the bottom pressure of the lift cylinders 13 is lower than the reference value P over the entire period of the forward movement process, and is higher than the reference value P over the entire period of the excavation process, so that this difference is very clear.

Furthermore, in the first half of the reverse movement and boom raising process (FIG. 2D), the forward movement and boom raising process (FIG. 2E), and the soil dumping process (FIG. 2F), the bottom pressure of the lift cylinders 13 is higher than the reference value P, and thereafter it is lower than the reference value P. The time for the forward movement process is normally some seconds (for example five seconds). Accordingly, the bottom pressure of the lift cylinders 13 is lower than the predetermined pressure P over a predetermined time period (for example one second), and thereafter rises, and, when the time point at which it exceeds the reference value P is detected, it is possible to determine that this time point is the time point of the starting of the excavation process.

In the following, the control for detecting the time point at which the operation process starts will be explained in concrete terms using the flow chart of FIG. 9.

After the start of work, in a step S101, the controller 50 determines whether or not the bottom pressure of the lift cylinders 13 is less than or equal to the reference value P, based upon the result of detection by the bottom pressure detector 45. If the result of this step S101 is NO, then the flow of control returns to before the step S101. If the result of this step S101 is YES, then the flow of control proceeds to a step S102, and the controller 50 starts time measurement.

In a step S103, the controller 50 makes a determination as to whether or not the state in which the bottom pressure of the lift cylinders 13 is greater than or equal to the reference value P has continued over at least a predetermined time period (for example, one second). If the result of this step S103 is NO, then the flow of control returns to before the step S103. If the result of this step S103 is YES, then the flow of control proceeds to a step S104, and the controller 50 makes a determination as to whether or not the bottom pressure of the lift cylinders 13 exceeds the reference value P. If the result of this step S104 is NO, then the flow of control returns to before the step S104. If the result of this step S104 is YES, then the flow of control proceeds to a step S105, and the controller 50 determines that the excavation process has started.

Next the control for the excavation completed determination shown in the step S14 of FIG. 4, in which it is determined whether or not the excavation process has been terminated, will be explained.

The fact that the excavation process has terminated may be determined using the determination conditions A1, A2, and A3 as described below, based upon the direction of shifting of the vehicle during each of the processes of the excavation and loading work shown in FIG. 2, and upon the changes of the bottom pressure of the lift cylinders 13 during each of the processes shown in FIG. 8.

The determination condition A1: after the start of the excavation process, the transmission 23 is changed over from forward traveling to neutral or to reverse traveling.

The determination condition A2: After the start of the excavation process, the bottom pressure of the lift cylinders 13 has dropped below the reference value P, and thereafter has maintained a state lower than the reference value P over a predetermined time period (for example, one second).

Figure 9:
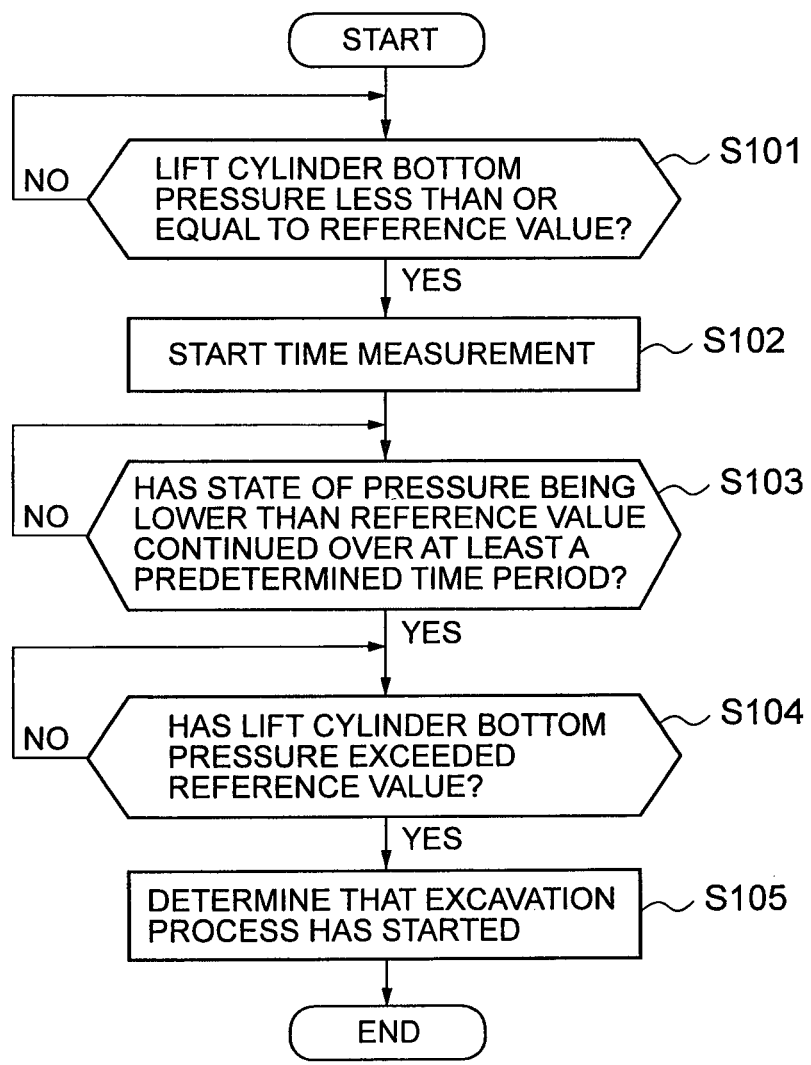
FIG. 9 is a flow chart showing a control procedure which determines the start of the excavation process.

By the way, even if during the control for determining the start of excavation shown in FIG. 9 it has been temporarily determined in the step S105 that the excavation process has started, it may be sometimes be the case that actually the excavation process is not being performed. For example, a case such as when the vehicle collides with the subject material for work Z and suddenly moves downwards, so that the bottom pressure of the lift cylinders 13 exceeds the reference value P only instantaneously, or a case when during forward traveling, due to irregularities upon the surface of the road, a shock is instantaneously generated and applied to the work apparatus 10, or the like, may correspond to this. Since, in this type of case, the excavation process has not yet actually started, it is necessary to return the engine 21 from the high output mode to the low output mode. In order to perform this control, after having determined that the excavation process has started, the continuous time period is measured in which the bottom pressure of the lift cylinders 13 exceeds the reference value P, and if this continuous time period does not exceed a predetermined time period, it is determined that the excavation process has terminated (i.e., has not yet started). This is termed the determination condition A3.

In this embodiment, if any one among the above described determination conditions A1 to A3 has been satisfied, it is determined that the excavation task has terminated.

In the following, the control for detecting that the excavation process has terminated will be explained in concrete terms, using the flow chart shown in FIG. 10.

First, the determination condition A1 will be explained. In a step S109, the controller 50 inputs the detection signal from the shift position detector 31 (FIG. 3), and determines whether or not the transmission 23 is in the neutral or the reverse traveling position. If the result of the step S109 is NO, then the flow of control returns to before this step S109. But if the result of the step S109 is YES, then the flow of control proceeds to a step S110, and the controller 50 determines that the excavation process has terminated.

Next, the determination condition A2 will be explained. In a step S114, the controller 50 makes a determination as to whether or not the bottom pressure of the lift cylinders 13 is less than or equal to the reference value P. If the result of the step S114 is NO, then the flow of control returns to before this step S114. But if the result of the step S114 is YES, then the flow of control proceeds to a step S115, and the controller 50 starts time measurement.

In a step S116, the controller 50 makes a determination as to whether or not the time period which is being measured, in other words the time period over which the bottom pressure of the lift cylinders 13 has been in a state lower than the reference value P, has continued over a second set time period which is determined in advance (for example 0.5 seconds). If the result of the step S116 is NO, then the flow of control returns to before this step S116. But if the result of the step S116 is YES, then the flow of control proceeds to the step S110, and the controller 50 determines that the excavation process has terminated.

Next, the determination condition A3 will be explained. In a step S112, the controller 50 starts time measurement. In a step S113, the controller 50 makes a determination as to whether or not the time period which is being measured, in other words the time period over which the bottom pressure of the lift cylinders 13 has continued to be in the state higher than the reference value P, has exceeded a first set time period (for example one second) which is determined in advance. If the result of the step S113 is YES, then the flow of control returns to before the step S112. But if the result of the step S113 is NO, then the flow of control proceeds to the step S110, and the controller 50 determines that the excavation process has terminated.

It should be understood that, as a variant embodiment, it would be acceptable to arrange to perform the determination condition A3 before performing the determination conditions A1 and A2, and to arrange to perform the determination conditions A1 and A2 if the result of the step S113 of the determination condition A3 is YES. Or, as another variant embodiment, it would also be acceptable to perform the determination of the determination condition A3 directly after the step S105 of the excavation start determination shown in FIG.

Figure 10:
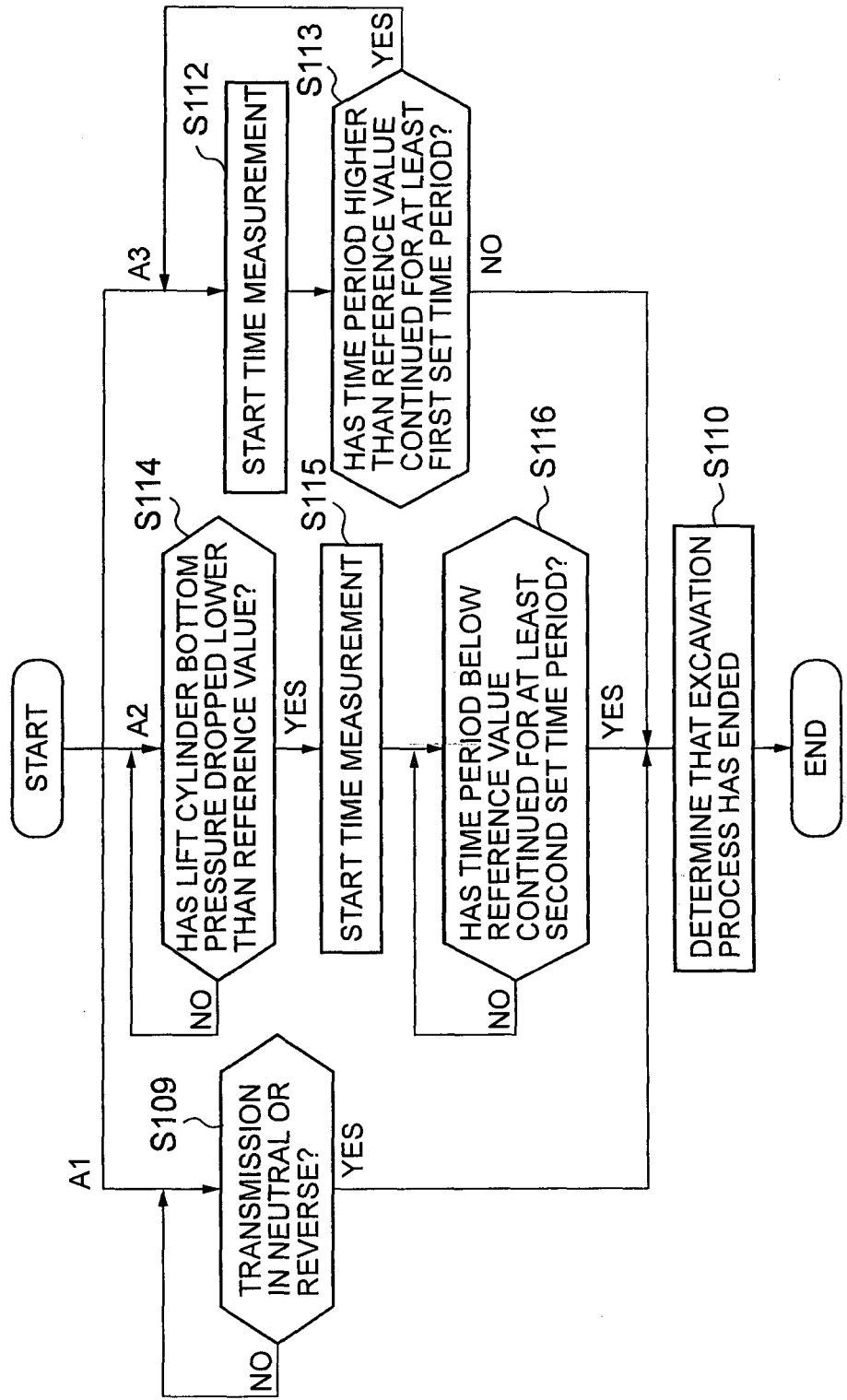
FIG. 10 is a flow chart showing a control procedure which determines the end of the excavation process.

9, and to omit the determination of the determination condition A3 in the control for the excavation completed determination shown in FIG. 10.

As has been explained above, based upon the state of the bottom pressure of the lift cylinders 13, the controller 50 determines whether or not the current process is the excavation process, and controls the power output capacity of the engine 21 during the excavation process in the high output mode, while, during any process other than the excavation process, it controls the power output capacity of the engine 21 in the low output mode. Since, by doing this, working is performed at a high power output capacity during heavy work, and at a low power output capacity during other light work, accordingly it is possible to obtain only the power output which is necessary for the work, and moreover it is possible to prevent useless high consumption of energy, so that the fuel consumption is reduced. Furthermore, it is possible to provide a comfortable operating feeling to the driver, since the output capacity of the engine 21 is automatically increased during the excavation process.

Moreover, it is determined that the excavation process has started when the bottom pressure of the lift cylinders 13 has exceeded the reference value P after it has been below the reference value P over the predetermined time period. Due to this, the fear of mistaken detection of the start of the excavation process during the reverse movement and boom raising process, during the forward movement and boom raising process, and during the soil dumping process is reduced. Furthermore, if it is only the case that the bottom pressure of the lift cylinders 13 instantaneously or temporarily has exceeded the reference value P, then the determination that the excavation process has started is immediately canceled. Due to this, even if for example a mistaken determination has been made that excavation work is under way and the engine 21 has been operated in the high output mode, it is possible to determine within a short time period that this is a mistaken determination, so that it is possible to prevent deterioration of the fuel consumption.

Yet further, after it is determined that the excavation process has started, it is determined that the excavation process has terminated when the transmission 23 is shifted to the neutral or to the reverse traveling position. Moreover, after it is determined that the excavation process has started, it is also determined that the excavation process has terminated when the bottom pressure of the lift cylinders 13 becomes less than or equal to the reference value P, and this situation has continued for longer than the second time period which has been determined in advance. Due to this, the accuracy of detection of the termination time point of the excavation process is high.

It should be noted that the bottom pressure of the lift cylinders 13 is used in the above described control for determining whether or not the excavation process is currently being performed. However, instead of, or in addition to, this, it would also be acceptable to utilize the bottom pressure of the tilt cylinder 15. For example, it would be possible to determine that the excavation process has started, when, after the bottom pressure of the tilt cylinder 15 has been in the state of being below a predetermined value over a predetermined time period, it has exceeded that predetermined value. Moreover, since the power output capacity of the engine is changed over to the high output mode when the above described bottom pressure has been raised to or above the reference value P by the bucket 12 digging into the subject material for work, at the time point thereafter when operation to tilt the bucket starts, the system is already in the high power output mode, so that no delay occurs in raising the power output of the engine.

Even further, in the above described control, as the material for determining whether or not the excavation process is currently taking place, it is possible to employ the force which is applied to an actuator of the work apparatus, such as the lift cylinders 13 or the tilt cylinder 15. However, this may also be performed using some other factor as material for the determination.

Now, a variant embodiment of control using such a different factor will be explained. In other words, in the evacuation start determination, the following determination conditions B1, B2, and B3 are used.

The determination condition B1: the transmission 23 is in the first or in the second forward traveling speed stage (F1 or F2).

The determination condition B2: the work apparatus 10 is in the excavation position.

The determination condition B3: the vehicle traveling speed is less than or equal to a set speed.

It is determined that the working vehicle is performing the excavation process, when at least one determination condition among these determination conditions B1 to B3 is fulfilled.

Figure 11:
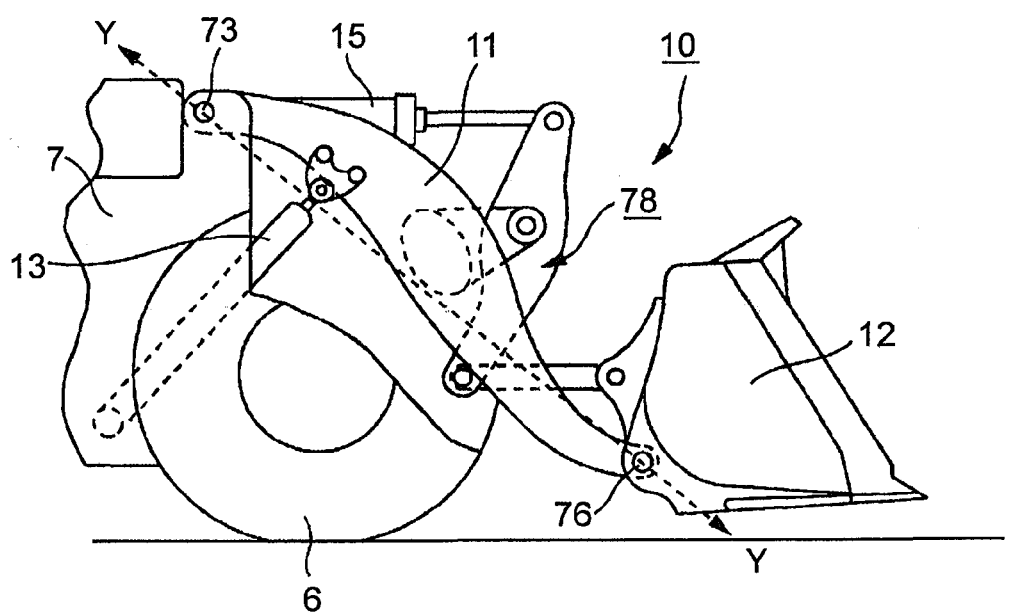
FIG. 11 is a side view showing an excavation position of the work apparatus.

Now, the excavation position of the above described determination condition B2 will be explained. FIG. 11 is a side view showing the work apparatus 10 in its excavation position.

As shown in FIG. 11, the base end portion of the lift arm 11 is freely pivotally attached to the front frame portion 7 via an arm pin 73, and the front frame portion and the lift arm 11 are coupled together by the lift cylinders 13, 13. When the lift cylinders 13, 13 extend, the lift arm 11 pivots about the arm pin 73 as a center. The bucket 12 is freely pivotally attached at the end portion of the lift arm 11 via a bucket pin 76, and the front frame portion 7 and the bucket 12 are coupled together by the tilt cylinder 15 and by a link device 78. When the tilt cylinder 15 extends, the bucket 12 pivots about the bucket pin 76 as a center.

By, for example, determining upon the line Y-Y which connects the arm pin 73 and the bucket pin 76 (i.e. the line which specifies the attitude or the position of the lift arm 11) as a reference line, the controller 50 is able to determine that the work apparatus 10 is in the excavation position, if the downwards dip of the reference line with respect to a horizontal line passing through the arm pin 73 is greater than or equal to a predetermined value. And, as a method for ascertaining the attitude or the position of this type of work apparatus 10, the controller 50 may, for example, employ a method of calculation by using the stroke of the lift cylinders 13, 13 which is detected by a stroke sensor (not shown in the figures) which is fitted to the lift cylinders 13, 13, or a method of calculation by using the angle of elevation of the lift cylinders 13, 13 which is detected by an angle sensor (not shown in the figures) which is fitted to the lift cylinders 13, 13, or a method of calculation based upon the operation commands which are outputted from the controller 50 to the lift operation valve 44, or the like.

Next, a variant embodiment for the control will be described which permits a high power output to be obtained during a specified state of working other than the excavation process. The control according to this variant embodiment may be employed together with the above described control which selects the high output mode during the above described excavation process, or may also be employed instead thereof.

Here, a control example will be explained in which the high output mode is selected when the wheel loader 1 is performing the action of uphill traveling upon inclined terrain.

It sometimes happens, when the wheel loader 1 is performing the action of uphill traveling upon a slanted surface which has a slope angle greater than or equal to a predetermined value, that a higher output torque is desired than the upper limit output torque which can be outputted in the low output mode. Accordingly, in this embodiment, a determination is made as to whether or not the vehicle is performing the action of uphill traveling, and it is arranged to obtain a higher power output if the vehicle is uphill traveling, than if it is not doing so.

Referring again to the previously described FIG. 3, to the vehicle body of this wheel loader 1 there are provided a pitch angle detector 46 which measures the pitch angle of the vehicle body in its longitudinal direction, an accelerator pedal opening degree detector 48 which measures the opening degree of an accelerator pedal 49, and an acceleration detector 47 which measures the acceleration of the vehicle, and each of these is connected to the controller 50. Based upon the outputs of these sensors 46 through 48, the controller 50 detects the pitch angle of the vehicle, the opening degree of the accelerator pedal, and the acceleration. With regard to the acceleration, instead of using the acceleration detector 47, it would also be acceptable to calculate it from the speed which has been detected by the speed meter 34. The controller 50 determines that the vehicle is traveling uphill, if the vehicle is inclined at a pitch angle greater than or equal to a constant value and moreover is being driven. Furthermore the controller 50 determines that the vehicle is traveling uphill, if an acceleration greater than a predetermined value is not being obtained, although the accelerator pedal is being opened up by greater than or equal to a constant value. Or it may be determined whether or not the vehicle is traveling uphill, only from the accelerator pedal and the acceleration.

Figure 12:
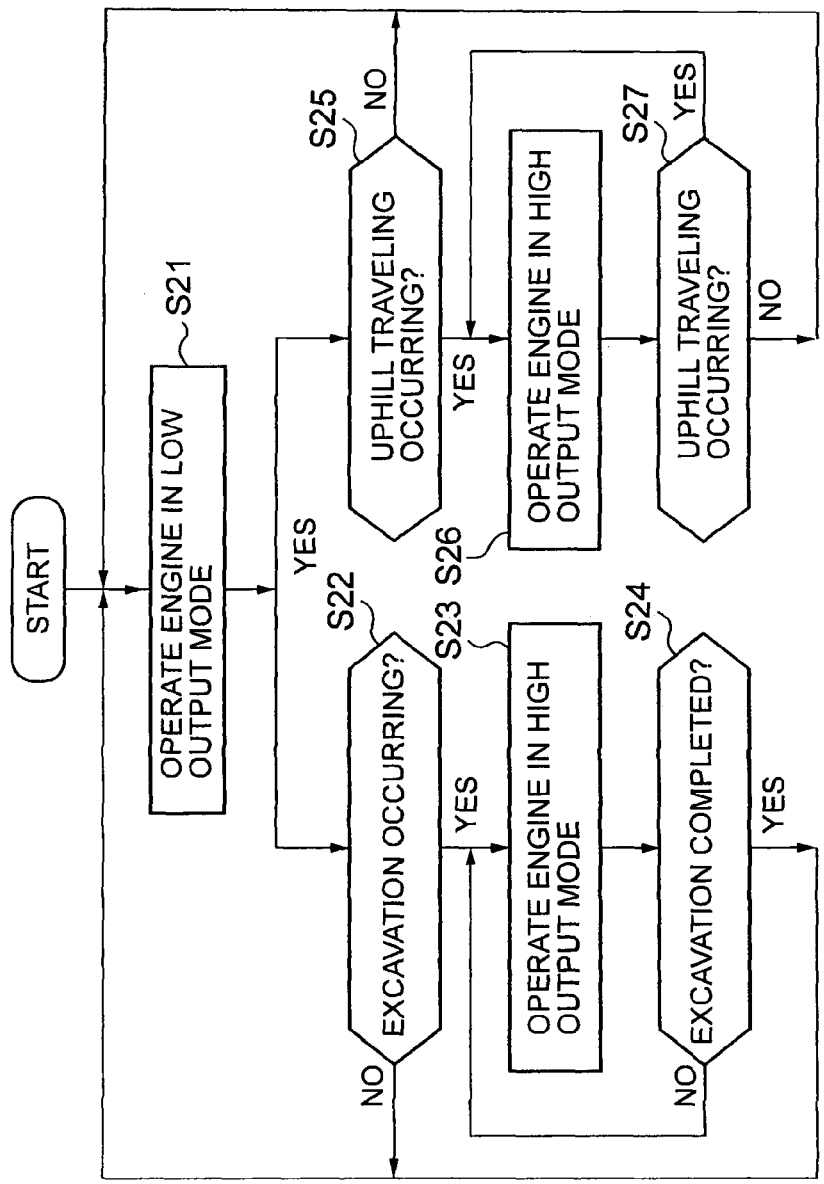
FIG. 12 is a flowchart showing a summary of a control procedure for selecting high output mode when, during the excavation process, the vehicle is moving up a slope.

FIG. 12 is a flow chart showing the control procedure for the engine 21, according to this variant embodiment.

In a step S21, the controller 50 outputs a command to the governor 27 simultaneously with the starting of the engine 21, and performs limitation of the power output by, for example, restricting the injection amount of the fuel injection pump or the like, so that the engine 21 operates in the low output mode. And, in a step S22, the controller 50 performs the previously described excavation start determination, and determines whether or not the wheel loader 1 is performing the excavation process. If the result of the step S22 is that it is determined that the excavation process is not being performed, then the flow of control returns to the step S21. But, if the result of the step S22 is that it is determined that the excavation process is being performed, then the flow of control proceeds to a step S23, and the controller 50 outputs a command to the governor 27, so as to return to the state in which the above described limitation of the injection amount of the fuel injection pump is not being imposed, so that it is possible for the engine 21 to manifest its high power output capacity and to operate in the high output mode.

After having entered into operation in the high output mode, in a step S24, the controller 50 performs the previously described excavation completed determination, and makes a determination as to whether or not the excavation process by the wheel loader 1 has terminated. If the result of the step S24 is that it is determined that the excavation process has not terminated, then the flow of control returns to the step S23. But, if the result of the step S24 is that it is determined that the excavation process has terminated, then the flow of control returns to the step S21, and the engine 21 operates in the low output mode.

Moreover, in parallel with the step S22, in a step S25, the controller 50 performs the above described uphill traveling determination, and determines whether or not the wheel loader 1 is currently traveling uphill. If the result of the step S25 is that it is determined that the vehicle is not traveling uphill, then the flow of control returns to the step S21. But, if the result of the step S25 is that it is determined that the vehicle is traveling uphill, then the flow of control proceeds to a step S26, in which the controller 50 outputs a command to the governor 27, and returns to a state in which the above described limitation upon the injection amount by the fuel injection pump is not imposed, so that the engine 21 is able to operate in its high output mode in which it can manifest a high power capacity.

After having entered into operation in the high output mode, in a step S27, the controller 50 performs the previously described uphill traveling determination, and makes a determination as to whether or not the wheel loader 1 is currently traveling uphill. If the result of the step S27 is that it is determined that the vehicle is traveling uphill, then the flow of control returns to the step S26. But, if the result of the step S27 is that it is determined that the vehicle is not traveling uphill, then the flow of control returns to the step S21, and the controller 50 operates the engine 21 in the low output mode.

By the way, although, in the above described control, the engine 21 operates in the same type of high output mode during excavation work and during uphill traveling as well, the control is not to be considered as being limited by this feature. For example it would also be acceptable, during uphill traveling, to arrange to operate the engine 21 in an intermediate output mode, in which it has a power output capacity which is intermediate between the low output mode and the high output mode. Or, it would also be acceptable to detect the magnitude of the load when climbing the slope, and to vary the power output capacity of the engine 21 stepwise, or continuously, according to this magnitude of the load. Since, in either case, a sufficient power output can be obtained by the above described type of control, not only during the excavation process, but also when traveling uphill, accordingly it is possible to perform smooth operation.

Next, a yet further variant embodiment for controlling the power output capacity of the engine will be explained.

With the control according to this variant embodiment, the controller 50 determines which one among the processes shown in FIG. 2A through FIG. 2H is currently being executed, based upon the result of detecting the work load of the wheel loader 1, and controls the power output capacity of the engine 21 based upon the result of this determination.

Figure 13:
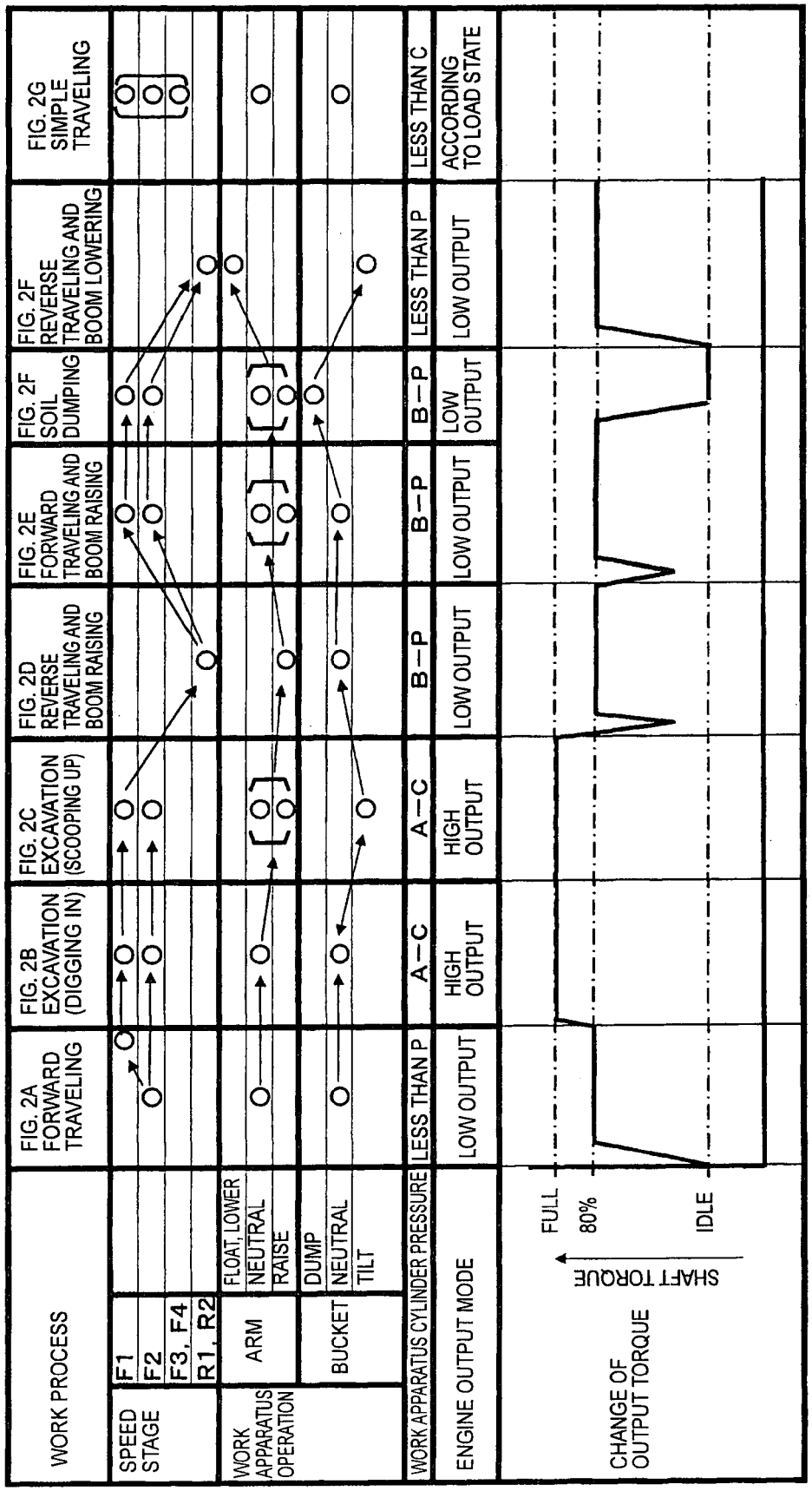
FIG. 13 is a figure for explaining a determination as to which process is currently being performed, and control of changeover of the output mode of the engine.

FIG. 13 shows in a table a method for determining which process is currently being performed in this control, and a method for controlling the power output capacity of the engine according to the result of that determination.

In the table shown in FIG. 13, in the uppermost line "work process", there is given the name of the work process as shown in FIG. 2A through FIG. 2H. Below this, in the lines "speed stage", "work apparatus operation", and "work apparatus cylinder pressure", there are shown various determination conditions which are used by the controller 50 for determining as to which of the processes is the current process.

In other words, in the line "speed stage", determination conditions with regard to the speed stage of the transmission 23 are shown by circular marks. Here, the case is assumed in which the transmission 23 has four forward traveling speed stages F1 through F4, and two reverse traveling speed stages R1 and R2. Furthermore, in the line "work apparatus operation", determination conditions with regard to operation of the work apparatus 10 by the driver are shown by circular marks. In other words, in the line "arm", there is shown a determination condition related to operation for the lift arm 11, while in the line "bucket" there is shown a determination condition related to operation for the bucket 12. Moreover, in the line "work apparatus cylinder pressure", there are shown determination conditions related to the current hydraulic oil pressure of a cylinder of the work apparatus 10, for example the bottom pressure of the lift cylinder 11. Here, in relation to the lift cylinder bottom pressure, as shown in FIG. 8, apart from the previously described reference value P, three reference values A, B, and C which are higher than this reference value P are set in advance, and a plurality of pressure ranges are defined by these reference values A, B, and C (for example, a range less than the reference value P, a range from the reference value A to the reference value C, a range from the reference value B to the reference value P, and a range below the reference value C), with these pressure ranges being set as the above described determination conditions.

By using a combination of the determination conditions "speed stage", "arm", "bucket", and "work apparatus cylinder pressure" for each of the above processes, the controller 50 becomes able to determine which of the processes is the process which is currently being performed.

In the line "engine output mode", it is shown which of the "high output mode" and the "low output mode" the controller 50 selects as a result of the above described determination. Below this, in the line "change of output torque", an example is shown in concrete terms of how the output torque of the engine 21 varies as a result of this type of engine power output control.

The concrete operation of the controller 50 when performing the control shown in FIG. 13 will now be explained in the following.

The controller 50 stores combinations of the determination conditions "speed stage", "arm", "bucket", and "work apparatus cylinder pressure" corresponding to each of the processes shown in FIG. 13 in advance. And the controller 50 ascertains the speed stage (F1 through F4, or R1 or R2) of the transmission 23 which is currently selected, based upon the signal from the shift position detector 31 shown in FIG. 3, ascertains the current type of operation for the lift arm 11 (for example, float, lower, neutral, or raise) based upon the signal from the arm operation command detector 32, and ascertains the current type of operation for the bucket 12 (for example, dumping, neutral, or tilting), based upon the signal from the bucket operation command detector 33. Moreover, the controller 50 ascertains the current bottom pressure of the lift cylinder 11, based upon the signal from the bottom pressure detector 45 shown in FIG. 3.

And the controller 50 performs a so called matching procedure by comparing the combination of the current speed stage, the current type of operation of the arm, the current type of operation of the bucket, and the current lift cylinder bottom pressure which have thus been ascertained (in other words, the current working state) with the combinations of determination conditions for "speed stage", "arm", "bucket" and "work apparatus cylinder pressure" corresponding to each of the processes which are stored in advance. As the result of this matching procedure, the controller 50 determines which is the process corresponding to the combination of determination conditions which best matches the current working state.

Now, in concrete terms, the combination of determination conditions corresponding to each of the processes shown in FIG. 13 is as follows.

The forward movement process (FIG. 2A): In the speed stage F1, with both the arm operation and the bucket operation in neutral, the work apparatus cylinder pressure is less than the reference value P. With regard to the speed stage, it is possible to employ as the determination condition, not only simply that the current speed stage is F1 or F2, but also that the speed stage has been changed over from F2 to F1, i.e. a shift down condition (since it often happens that the vehicle is driven forward after having been first shifted down to F1 from being in the stage F2). Furthermore, it is also possible to employ, as a further determination condition related to the determination history, that the process which was determined upon directly before was the reverse movement and boom lowering process.

The excavation process (the digging in sub-process) (FIG. 2B): In the speed stage F1 or F2, with the lift arm operation and the bucket operation both at neutral, the work apparatus cylinder pressure is in the range from the reference value A to the reference value C. Furthermore, it is also possible to employ, as a further determination condition related to the determination history, that the process which was determined upon directly before was the forward movement process.

The excavation process (the scooping up sub-process) (FIG. 2C): In the speed stage F1 or F2, with the lift arm operation at "raise" or neutral, and with the bucket operation at "tilt", the work apparatus cylinder pressure is in the range from the reference value A to the reference value C. Furthermore it would also be acceptable to add another determination condition with regard to the bucket operation, such as one which includes the case that alternate shifts between "tilt" and neutral is repeated (since, according to the subject material for work, it sometimes happens to repeat the operation of tilting back the bucket 12, then putting it into neutral, and then again tilting it back.). Furthermore it is also possible to employ, as a further determination condition related to the determination history, that the process which was determined upon directly before was the excavation digging in sub-process.

The reverse movement and boom raising process (FIG. 2D): In the speed stage R1 or R2, with the lift arm operation at "raise", and with the bucket operation at neutral, the work apparatus cylinder pressure is in the range from the reference value B to the reference value P. Furthermore it is also possible to employ, as a further determination condition related to the determination history, that the process which was determined upon directly before was the excavation scooping up sub-process.

The forward movement and boom raising process (FIG. 2E): In the speed stage F1 or F2, with the lift arm operation at "raise" or neutral, and with the bucket operation at neutral, the work apparatus cylinder pressure is in the range from the reference value B to the reference value P. Furthermore it is also possible to employ, as a further determination condition related to the determination history, that the process which was determined upon directly before was the reverse movement and boom raising process.

The soil dumping process (FIG. 2F): In the speed stage F1 or F2, with the lift arm operation at "raise" or neutral, and with the bucket operation at "dump", the work apparatus cylinder pressure is in the range from the reference value B to the reference value P. Furthermore it is also possible to employ, as a further determination condition related to the determination history, that the process which was determined upon directly before was the forward movement and boom raising process.

The reverse movement and boom lowering process (FIG. 2G): In the speed stage R1 or R2, with the lift arm operation at "float" or "lower", and with the bucket operation at "tilt", the work apparatus cylinder pressure is in the range less than the reference value P. Furthermore it is also possible to employ, as a further determination condition related to the determination history, that the process which was determined upon directly before was the soil dumping process.

The simple traveling process (FIG. 2H): In the speed stage F1, F2, F3, or F4, with the lift arm operation and the bucket operation both at neutral, the work apparatus cylinder pressure is in the range less than the reference value C.

The controller 50 determines which process is the current process by finding out, from among the combinations of determination conditions for each of the processes as described above, which one best matches the current working state (it is possible to include, not only the current working state, but also, as described above, speed change shifting operation and changes of the operation of the work apparatus, or the history of previous determinations). And the controller 50 operates the engine 21 in the engine output mode which corresponds to the process which is determined upon. In other words, as shown in FIG. 13, if it is determined that the current process is the excavation process, the controller 50 operates the engine 21 in the high output mode. On the other hand, if it is determined that the current process is the forward movement process, the reverse movement and boom raising process, the forward movement and boom raising process, or the reverse movement and boom lowering process, then the controller 50 operates the engine 21 in the low output mode. Furthermore, if it is determined that the current process is the simple traveling process, then the controller 50, for example, determines the magnitude of the load which is being imposed upon the vehicle by, as already explained, performing a determination as to whether or not the vehicle is traveling uphill or the like, and selects the low output mode or the high output mode, according to this magnitude of the load. Since the power output capacity of the engine is controlled according to the result of a determination which is based upon the combinations of transmission operation and work apparatus operation by the driver, and the cylinder hydraulic oil pressure of the work apparatus and so on, accordingly it is possible to change the power output capacity in conformance to the transition between processes.

As a result of the above described control, as shown in the lowermost line of FIG. 13, in the excavation and loading work, if the driver steps upon the accelerator pedal during the excavation process, the output torque of the engine 21 is raised to the full torque which the engine 21 is capable of outputting. However, during processes other than the excavation process, even if the driver presses the accelerator pedal to the floor, the output torque of the engine 21 only rises to the upper limit torque which has been imposed, for example 80% of full torque, so that to this extent fuel is economized. By the way, in this torque variation curve, reduction of the output torque which is temporarily engendered when the transmission 23 is changed over between forward traveling and reverse traveling is caused by the driver temporarily releasing the stepping on of the accelerator pedal. Furthermore, reduction of the output torque in the latter half of the soil dumping process is caused by the driver releasing the stepping on of the accelerator pedal after all of the subject material for work has been dumped.

Although, in the above, embodiments of the present invention have been explained, these embodiments are only provided by way of example for explaining the present invention; and it is not intended to restrict the range of the present invention only to these embodiments. The present invention may also be embodiment in various other manners, provided that its gist is not departed from.

For example, the present invention may also be applied to a working vehicle of a different type, other than a wheel loader. And variations are possible in the method of detecting the working state, according to the type of working vehicle to which the present invention is applied. For example, in the case of a hydraulic shovel, it would be acceptable to determine the magnitude of the load which was being applied to the hydraulic shovel by detecting the hydraulic oil pressure of a boom cylinder, an arm cylinder, or a bucket cylinder.

Although in the above described embodiments it was arranged that, in the high output mode, it was possible to manifest the rated or the maximum power output capacity, without imposing any limitation upon the power output of the engine, the method of control is not limited only to this case. For example, it would also be acceptable to arrange to obtain, in the high output mode, a low power output capacity which is slightly smaller than the maximum power output capacity. Moreover, it would also be acceptable to prepare a plurality of engine output modes whose torque curves have different shapes, and to arrange to make an appropriate selection from those modes according to the current working state.

Furthermore, instead of, or in addition to, the above described control in which selection is performed between a plurality of engine output modes which are prepared in advance, it would also be acceptable to control the variation of the power output capacity of the engine continuously, in other words in a stepless manner, by the controller 50 calculating the power output capacity so as to match the size of the load, or the working condition, which has been detected.

The invention claimed is:
1. A wheel loader that carries out excavation and loading work while traveling, comprising:
a work apparatus driven by a power output of an engine, the work apparatus carrying out the excavation and loading work;
a travel apparatus driven by the power output of the engine, the travel apparatus including a transmission and carrying out the traveling;
a hydraulic oil pressure detector that is configured to detect a hydraulic oil pressure of one or more hydraulic cylinders which drive the work apparatus;
a transmission operation detector that is configured to detect an operation of the transmission or a speed stage that is selected in the transmission;
a work apparatus operation command detector which is configured to detect an operation command to the work apparatus; and
a controller that is configured to control a power output capacity that is a maximum power output that can be output by the engine,
wherein the controller stores combinations of hydraulic oil pressures, operation states of the transmission or the speed stage and an operation command which correspond to the following processes:
 (i) a forward traveling process in which a bucket is set into an excavation attitude and in which the travel apparatus travels forward towards a subject material for work;
 (ii) an excavation process in which the bucket digs into the subject material for work and scoops up the subject material for work into the bucket;
 (iii) a reverse traveling and boom raising process in which the lift arm is raised while driving the travel apparatus to travel backwards;
 (iv) a forward traveling and boom raising process in which the lift arm is further raised until the height of the bucket reaches a loading height;
 (v) a soil dumping process in which the bucket is dumped at a predetermined position; and

(vi) a reverse traveling and boom lowering process in which the lift arm is lowered while driving the travel apparatus to travel backwards and in which the bucket is returned to the excavation attitude, wherein the controller carries out a determination as to which process is currently being performed based on a comparative result of a combination of a detected value that has been detected by the hydraulic oil pressure detector, a detected value that has been detected by the transmission operation detector and a detected operation command that has been detected by the work apparatus operation command detector with the combinations corresponding to the processes and a history of previous determinations, and wherein the controller controls the power output capacity in conformance to a transition between the processes.

* * * * *